(12) United States Patent
Smaidris

(10) Patent No.: US 8,772,559 B2
(45) Date of Patent: Jul. 8, 2014

(54) BIOCHAR GENERATOR AND ASSOCIATED METHODS

(71) Applicant: Data Flow Systems, Inc., Melbourne, FL (US)

(72) Inventor: Thomas F. Smaidris, Melbourne, FL (US)

(73) Assignee: Data Flow Systems, Inc., Melbourne, FL (US)

( * ) Notice: Subject to any disclaimer, the term of this patent is extended or adjusted under 35 U.S.C. 154(b) by 0 days.

(21) Appl. No.: 13/947,221

(22) Filed: Jul. 22, 2013

(65) Prior Publication Data

US 2013/0299332 A1  Nov. 14, 2013

Related U.S. Application Data

(63) Continuation-in-part of application No. 13/282,124, filed on Oct. 26, 2011, now Pat. No. 8,558,044.

(51) Int. Cl.
*C07C 1/00* (2006.01)
*C10B 47/00* (2006.01)

(52) U.S. Cl.
USPC ............... 585/240; 585/242; 44/605; 44/606; 201/1; 201/16; 201/28; 201/30

(58) Field of Classification Search
USPC ........... 585/240, 242; 44/605, 606; 201/1, 16, 201/28, 30; 202/117, 118; 56/16.4 B, 56/16.4 A, 500, 10.2
See application file for complete search history.

(56) References Cited

U.S. PATENT DOCUMENTS

| | | | |
|---|---|---|---|
| 4,253,406 A | 3/1981 | Spitz | |
| 4,359,951 A * | 11/1982 | Dauvergne | 110/234 |
| 5,853,548 A | 12/1998 | Piskorz et al. | |
| 6,585,899 B1 | 7/2003 | Edvardsson et al. | |
| 7,322,301 B2 | 1/2008 | Childs | |
| 7,731,578 B2 | 6/2010 | Birrell | |
| 7,882,646 B2 * | 2/2011 | Gorbell et al. | 34/514 |
| 7,931,783 B2 * | 4/2011 | Dam-Johansen et al. | 201/3 |
| 7,943,014 B2 * | 5/2011 | Berruti et al. | 202/108 |
| 7,947,155 B1 * | 5/2011 | Green et al. | 201/2 |
| 7,959,736 B2 | 6/2011 | Cullinger | |
| 7,975,398 B2 * | 7/2011 | Carin et al. | 34/60 |
| 8,168,044 B2 * | 5/2012 | Weigelt | 202/83 |
| 8,191,282 B2 * | 6/2012 | Weigelt | 34/274 |
| 8,304,590 B2 * | 11/2012 | Hopkins et al. | 585/240 |
| 8,404,006 B2 * | 3/2013 | Weigelt | 44/589 |
| 2001/0002037 A1 | 5/2001 | Cullinger | |
| 2007/0012232 A1 | 1/2007 | Skrypski-Mantele | |
| 2008/0006520 A1 | 1/2008 | Badger | |
| 2009/0313961 A1 | 12/2009 | Weigelt | |
| 2012/0103781 A1 | 5/2012 | Smaidris et al. | |
| 2013/0081934 A1 * | 4/2013 | New | 201/8 |
| 2013/0192321 A1 * | 8/2013 | Cheiky et al. | 71/8 |

FOREIGN PATENT DOCUMENTS

DE   1020100247602   7/2010

* cited by examiner

*Primary Examiner* — Nina Bhat
(74) *Attorney, Agent, or Firm* — Mark R. Malek; G. Philip J. Zies; Zies Widerman & Malek

(57) ABSTRACT

A biochar generator may include a pyrolysis chamber, a heater connected to the pyrolysis chamber and a biochar collection chamber in communication with the pyrolysis chamber. A biochar collection chamber sensor may sense a composition of the biochar collected in the biochar collection chamber to define a sensed composition of the biochar. A controller in electrical communication with the biochar collection chamber sensor may utilize the sensed composition of the biochar to dynamically alter conditions in the pyrolysis chamber to alter the composition of the biochar.

24 Claims, 7 Drawing Sheets

FIG. 1 – Prior Art

BIOCHAR GENERATOR AND ASSOCIATED METHODS

RELATED APPLICATIONS

The present application is a continuation in part of U.S. patent application Ser. No. 13/282,124 titled Biochar Generator and Associated Methods, filed by the inventors of the present invention on Oct. 26, 2011 which, in turn, claimed the benefit of U.S. Provisional Patent Application Ser. No. 61/407,079 titled PORTABLE BIOCHAR GENERATOR AND ASSOCIATED METHODS filed by the inventor of the present invention on Oct. 27, 2010, the entire contents of each of which are incorporated herein by reference.

FIELD OF THE INVENTION

The present invention relates to the field of biochar generators and, more specifically, to the field of biochar generators to be carried by a vehicle to produce biochar.

BACKGROUND OF THE INVENTION

It is commonly known that the cultivation and harvesting of food crops and forest products results in the production of vast quantities of organic waste or biomass. It is also commonly known that biomass may be decomposed at high temperatures and in a reduced-oxygen setting in a reaction known as pyrolysis. Pyrolysis results in the release of volatile gasses and a residual solid material known as biochar. When the volatile gasses are condensed, a high-energy-content oil, called bio oil, is produced. Any remaining gas, called synthesis gas, is composed primarily of hydrogen and carbon monoxide, with small amounts of methane gas. Biochar, when used as a soil additive, provides a habitat for fungi and microorganisms beneficial to plant growth, stores moisture, decreases soil erosion, and decreases fertilizer runoff. Bio oil has a high BTU content, can be converted directly into electricity in petroleum-based power plants, and can be refined into diesel fuel. Very pure synthesis gas can be burned in a manner similar to natural gas, while less pure synthesis gas can still be burned for heat.

It is further commonly known that the typical pyrolysis reaction takes place at a location remote from that of the collection of the biomass consumed in the reaction. Once collected, the biomass is typically transported to a facility that either chips, grinds or otherwise fragments the biomass, and then the fragmented biomass is generally transported to the pyrolysis reaction site. The biomass fragments may then be augured into a pyrolyzing chamber. The auger provides a seal against oxygen to prevent combustion in the pyrolyzing chamber. The biochar and volatile gasses produced from the pyrolysis reaction rise within the pyrolyzing chamber until they are extracted. The biochar may be allowed to cool and is collected. The volatile gasses may be condensed and the resulting bio oil and synthesis gasses may be burned to provide the heat that drives the pyrolysis reaction. The collected biochar may then be transported to a field, orchard, packaging facility or other application. The typical biochar generation method, therefore, is inefficient in that energy must be consumed in the collection of the biomass, in the transportation of the collected biomass to the fragmentation site, in the fragmentation of the biomass, in the transportation of the fragmented biomass to the pyrolyzing chamber, in generating the heat that drives the pyrolysis reaction, and in the transportation of the biochar, bio oil and synthesis gasses to their ultimate applications.

FIG. 1 illustrates a schematic diagram depicting the typical biochar generation process known in the prior art. From the start (Block 201), biomass, in this example wood, is transported by truck to a biochar generation facility and then deposited in a storage area at Block 202. The biomass is moved to a biomass fragmenter, in this example a chipper, at Block 203. At Block 204, the fragmented biomass is fed into an auger. The fragmented biomass passes from the auger into the pyrolysis chamber at Block 205. Heat is introduced into the pyrolysis chamber at Block 206. Vaporized synthesis gasses and vaporized bio oil exit the pyrolysis chamber and enter the vapor condenser at Block 207. The condensed synthesis gasses are filtered at Block 208 and then fed back into the heater at Block 206. The condensed bio oil is collected at Block 209 and is transported by truck for refining or other use at Block 213. The biochar passes through the char spout at Block 210, is collected at Block 211 and is allowed to cool in the biochar cooling area at Block 212. The cooled biochar is then transported by truck for ultimate application at Block 214.

There are numerous devices that have attempted to provide a biochar generator. For example, U.S. Pat. No. 7,322,301 to Childs, discloses a system and method for processing sewerage sludge and other organic based feedstocks, in an energy efficient manner that minimizes or eliminates unwanted byproducts, including pathogens, and generates useful environmentally safe products. The sewage sludge or other feedstocks are partially dried before being input to a gasifier operating under partial pyrolitic conditions with a small amount of oxygen or air present to produce fuel in the form of synthesis gas, bio-oil fuel and char. A small percentage of the fuel may be used to maintain the operation of the feedstock drying process after it is started and a small amount of the synthesis gas produced in the gasifier reacts with the small amount of oxygen present with the feedstock to maintain the pyrolysis temperature in the gasifier in order to make the system economically viable.

U.S. Published Patent Application No. 2008/0006520 by Badger et al., discloses a system for the conversion of carbonaceous feedstocks into useful sources for energy, chemicals, or other materials including a dryer into which the carbonaceous feedstock is placed and a reactor chamber in communication with the dryer for receiving the dried feedstock. The system also includes a heat carrier for further processing of the feedstock in the generation of useful sources of energy, chemicals or other material. The system further includes a char separation and recovery mechanism linked to the reactor chamber for separating char produced as a result of processing of feedstock within the reactor chamber from the heat carrier. The system still further includes a condenser to recover a liquid product condensed from the gas and vapor, and a furnace for burning char as needed for operation of the disclosed system.

U.S. Published Patent Application No. 2007/0012232 by Skrypski-Mantele et al., discloses a system and method for thermal conversion of sludge into fuel and other products such as char without the creation of reaction water. The system and method disclosed allows for the independent control of mixing and the movement of sludge through pyrolysis systems.

U.S. Pat. No. 5,853,548 to Piskorz et al., discloses a thermolysis process for the production of volatiles for an external combustor or liquefaction of biomass solids. The thermolysis is carried out in a single fluidized bed of inert material operating at near atmospheric pressure, relatively low temperature, long residence times and moderate heating rates. The distribution of thermolysis products is among solid (char) and gases. The product effluent can either be quenched, to produce a high liquid yield in addition to a low char yield, or can be used in either the same combustor or a second combustor to produce heat energy. In using a quencher, the quenched liquid is of a similar composition to those obtained by a so-called fast pyrolysis process. The specified conditions are such as to allow production of liquids in high yields in an energy efficient manner. The low severity of the conditions allows simplified process design and scale-up leading to lower capital and operating costs as well as easier control.

U.S. Pat. No. 4,253,406 to Spitz et al. discloses a flueless portable primary combustion chamber forming part of a pollution control incineration system having an elongated duct with one or more inlets positioned at or near grade level. An upright standpipe covers an inlet opening to provide a polluted gas inlet to the duct from a location elevated above grade. The portable primary combustion chamber is constructed with a closed top and an open bottom which overfits the standpipe in a manner to allow combustible material to be burned within the shell and to direct combustion gases downwardly into the duct through the top of the standpipe.

Additionally, the pyrolysis reaction can be modified to alter the various products that may be produced in the pyrolysis chamber. The pyrolysis reaction produces biochar, bio oil and synthesis gases. The amount and composition of the various products can be changed by modifying the conditions of the pyrolysis chamber. Therefore, there exists a need to provide a biochar generator that is adapted to modify the conditions of the pyrolysis chamber to produce biochar, bio oil and synthesis gases in the amount or ratio desired. There is also a need to modify the conditions of the pyrolysis chamber to alter the composition of the output products.

SUMMARY OF THE INVENTION

Such needs are addressed in the present invention. The biochar generator includes a pyrolysis chamber whose conditions may be modified dynamically. The conditions of the chamber may be modified to advantageously change the composition of the output products such as the biochar, bio oil and synthesis gases. The conditions of the chamber may also be modified to alter the amount or ratio of the products produced by the pyrolysis reaction.

These and other objects, features and advantages according to embodiments of the present invention are provided by a biochar generator which may include a pyrolysis chamber, a heater connected to the pyrolysis chamber and a biochar collection chamber in communication with the pyrolysis chamber. A biochar collection chamber sensor may sense a composition of the biochar collected in the biochar collection chamber to define a sensed composition of the biochar. A controller in electrical communication with the biochar collection chamber sensor may utilize the sensed composition of the biochar to dynamically alter conditions in the pyrolysis chamber to alter the composition of the biochar.

The biochar generator may further include a vapor condenser connected to the pyrolysis chamber, a synthesis gas collection chamber in communication with the vapor condenser to collect synthesis gas from the vapor condenser, and a bio oil collection chamber in communication with the vapor condenser to collect bio oil from the vapor condenser. The biochar generator may also include a bio oil collection chamber sensor to sense a composition of the bio oil collected in the bio oil collection chamber to define a sensed composition of the bio oil. The controller may utilize the sensed composition of the bio oil to dynamically alter conditions in at least one of the pyrolysis chamber or the vapor condenser to alter the composition of the bio oil.

The biochar generator may further include a synthesis gas collection chamber sensor to sense a composition of the synthesis gas collected in the synthesis gas collection chamber to define a sensed composition of the synthesis gas. The controller may utilize the sensed composition of the synthesis gas to dynamically alter conditions in at least one of the pyrolysis chamber or the vapor condenser to alter the composition of the synthesis gas. The conditions altered in the pyrolysis chamber may be oxygen content in the pyrolysis chamber, temperature in the pyrolysis chamber, time that bio mass is pyrolysized in the pyrolysis chamber, flow of the bio mass into the pyrolysis chamber or pressure inside the pyrolysis chamber.

The conditions dynamically altered in the pyrolysis chamber may modify carbon content of the biochar, absorption properties of the biochar, or a ratio of biochar, synthetic gas and bio oil produced by the pyrolysis chamber. The biochar collection chamber sensor may be a laser sensor. The biochar generator may further include an auger having an opening formed therein and connected to the pyrolysis chamber to accept a flow of biomass. The biochar generator may further include a biochar application device to selectively permit application of the biochar.

A method aspect of the present invention is for generating biochar using a biochar generator. The method may include sensing a composition of the biochar collected in the biochar collection chamber to define a sensed composition of the biochar. The method may also include utilizing the sensed composition of the biochar to dynamically alter conditions in the pyrolysis chamber to alter the composition of the biochar.

DETAILED DESCRIPTION OF THE PREFERRED EMBODIMENT

Figure 1:
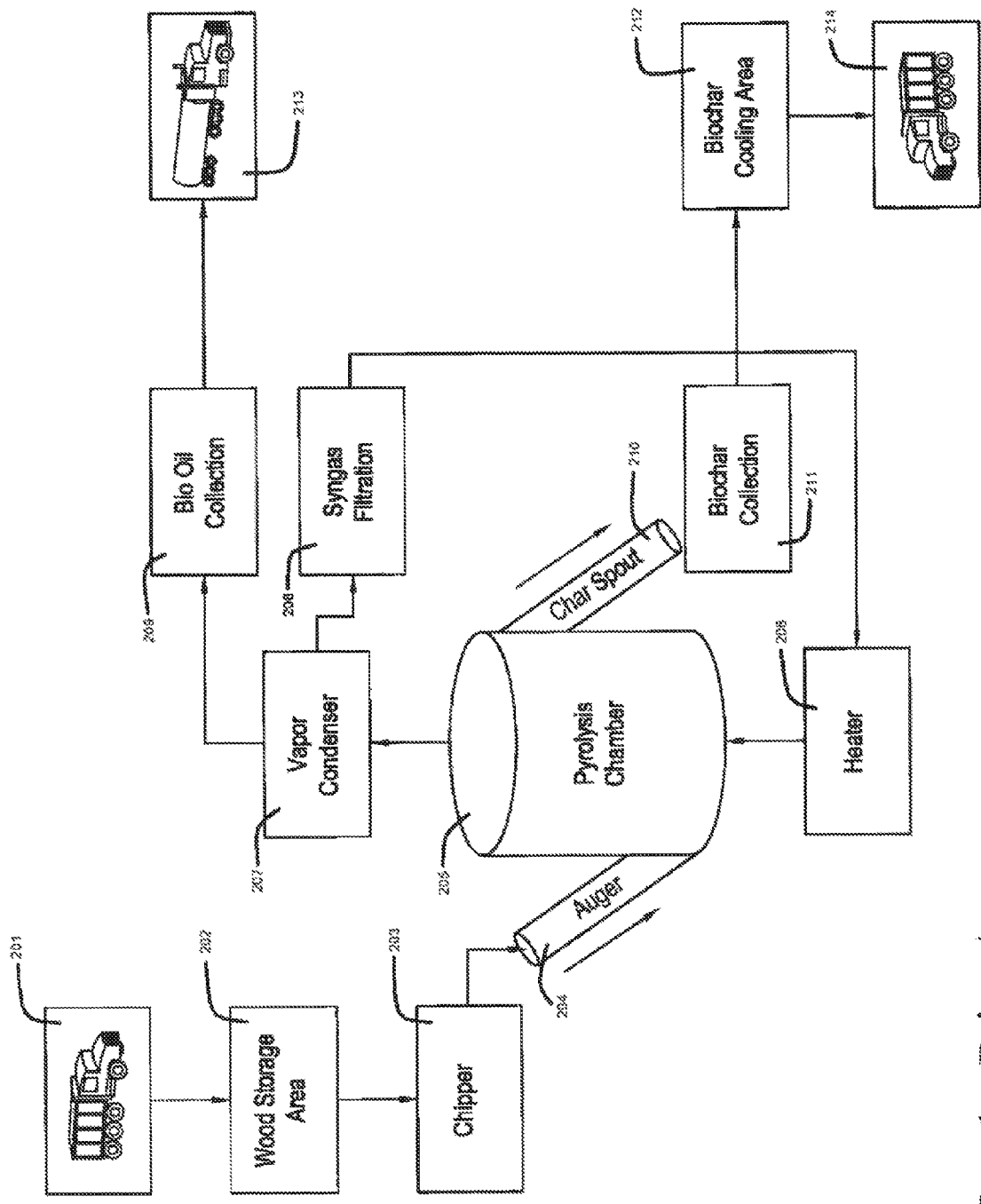
FIG. 1 is a schematic diagram showing the typical biochar generation process known in the prior art.

The present invention will now be described fully hereinafter with reference to the accompanying drawings, in which preferred embodiments of the invention are shown. Like numbers refer to like elements throughout. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art will realize that the following embodiments of the present invention are only illustrative and are not intended to be limiting in any way. Other embodiments of the present invention will readily suggest themselves to such skilled persons having the benefit of this disclosure.

A biochar generator to be carried by a vehicle 100 according to an embodiment of the present invention can advantageously provide a system for the generation of biochar that is adapted to reduce the energy consumed in the typical generation of biochar. More specifically, the biochar generator 100 according to the present invention advantageously eliminates the need to transport biomass to remote locations for fragmentation, pyrolysis and ultimate application. This is accomplished by providing a biochar generator 100 onboard the machinery harvesting the biomass as illustrated, for example, in FIG. 4. The biochar generator 100 according to an embodiment of the present invention also may be provided onboard a vehicle towed behind the machinery harvesting the biomass as illustrated, for example, in FIG. 5. Additionally, the biochar generator 100 according to an embodiment of the present invention may be provided onboard an independently operated vehicle following behind the machinery harvesting the biomass as illustrated, for example, in FIG. 6.

Referring now to FIGS. 2-6, general details of the biochar generator 100 according to an embodiment of the present invention are now described. As will be discussed in greater detail below, the unique design of the biochar generator 100 includes an auger 101, a pyrolysis chamber 102, a heater 103, a heat duct 104, a vapor duct 105, a vapor condenser 106, a synthesis gas collection chamber 107, a bio oil collection chamber 108, a biochar cooling chamber 109, a biochar conveyor 110, a biochar collection chamber 111, and a biochar application device 112.

Figure 2:
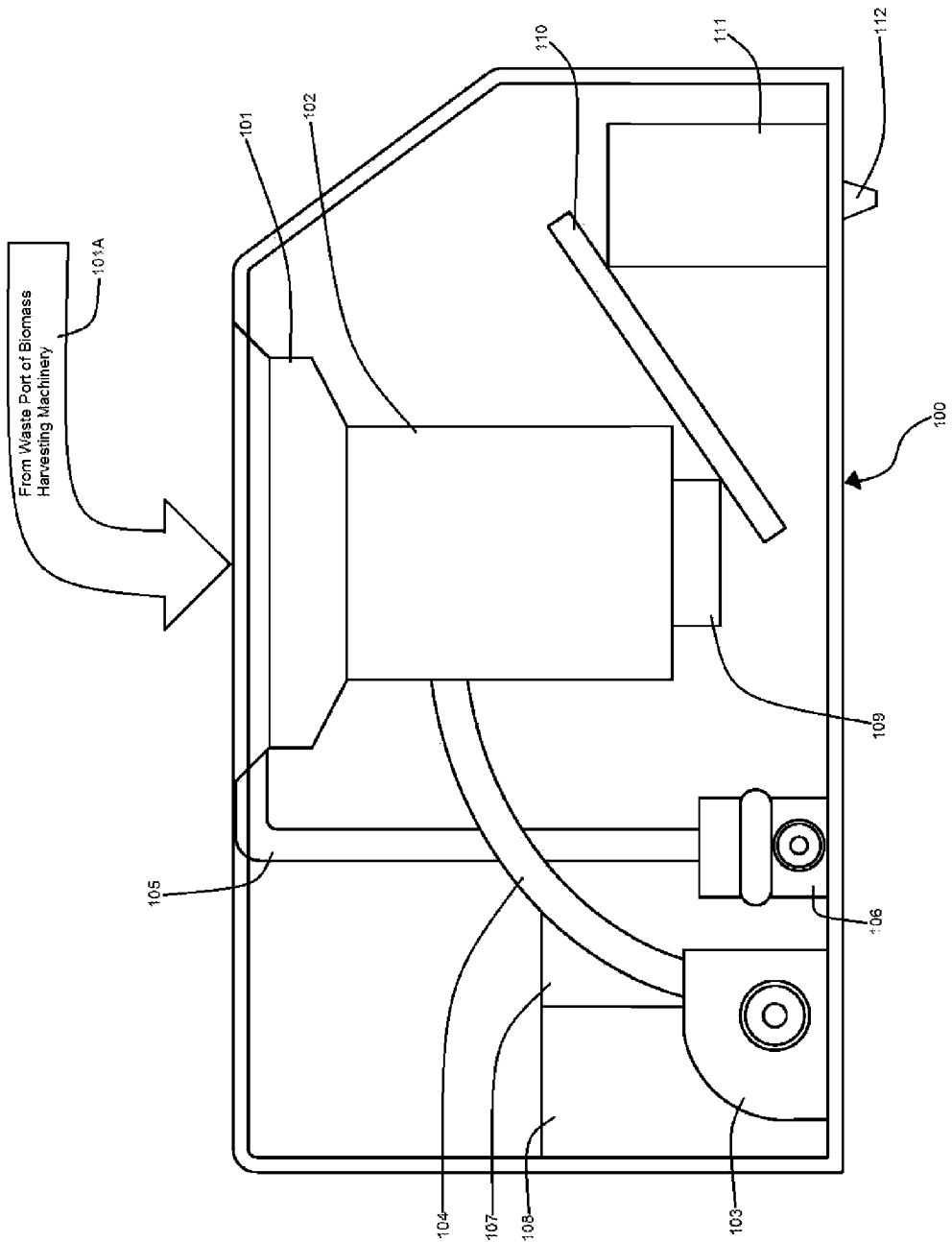
FIG. 2 is a side schematic view of a biochar generator to be carried by a vehicle according to the present invention.

Individual portions of the biochar generator 100 according to an embodiment of the present invention will now be discussed in greater detail. As depicted in FIG. 2, in one embodiment of the biochar generator 100, a flow of biomass 101A may be directed into the auger 101. The flow of biomass 101A may pass through the auger 101 and enter the pyrolysis chamber 102. The auger 101 may be adapted to control the amount of air permitted to pass into the pyrolysis chamber 102. The heat duct 104 may permit passage into the pyrolysis chamber 102 of the heat produced by the heater 103. The temperature within the pyrolysis chamber 102 may be increased to a predetermined temperature range of between 300 degrees Celsius and 600 degrees Celsius by the controlled introduction of heat produced by the heater 103. The temperature within the pyrolysis chamber 102 may be maintained at the predetermined temperature range for a predetermined period of time. The flow of biomass 101A may be heated within the pyrolysis chamber 102 to the point where vaporized synthesis gasses, vaporized bio oil and/or biochar are produced from the heated flow of biomass 101A.

The vaporized synthesis gasses and vaporized bio oil produced from the heated flow of biomass 101A may pass through the vapor duct 105 into the vapor condenser 106. The condensed synthesis gas may pass into the synthesis gas collection chamber 107. The synthesis gas collection chamber 107 may be adapted to permit the synthesis gas collected therein to be fed into the heater 103 as a source of fuel. The condensed bio oil may pass into the bio oil collection chamber 108. The bio oil collection chamber may be adapted to permit the bio oil collected therein to be fed into the biomass harvesting machinery as a source of fuel. The hot biochar may pass into the biochar cooling chamber 109. The biochar conveyor 110 may permit passage of the cooled biochar into the biochar collection chamber 111. The cooled biochar may pass through the biochar application device 112 to be deposited on a field, orchard or other ultimate application.

Figure 4:
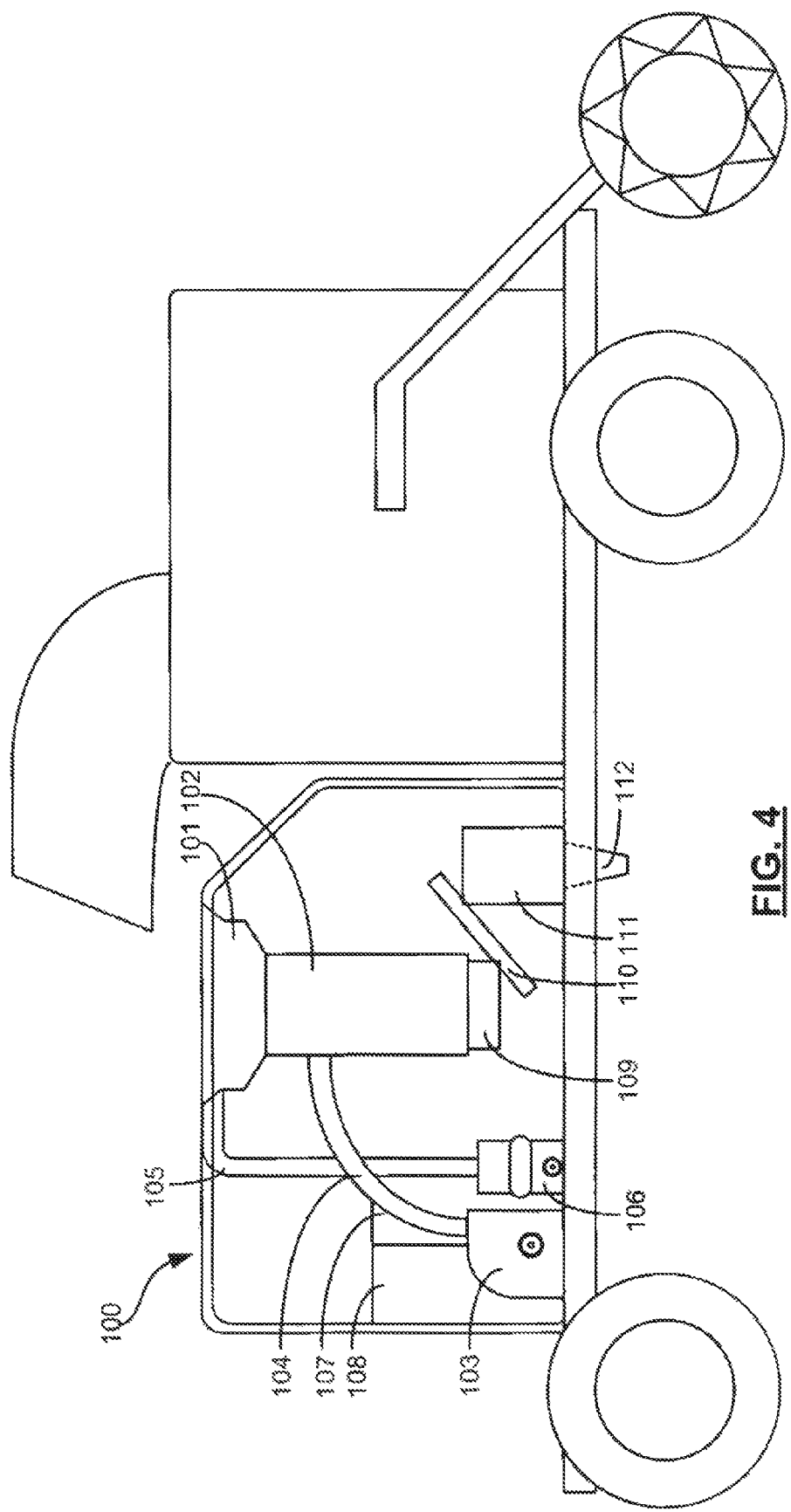
FIG. 4 is a side schematic view of a biochar generator located onboard a biomass harvesting machine according to an embodiment of the present invention.
Figure 5:
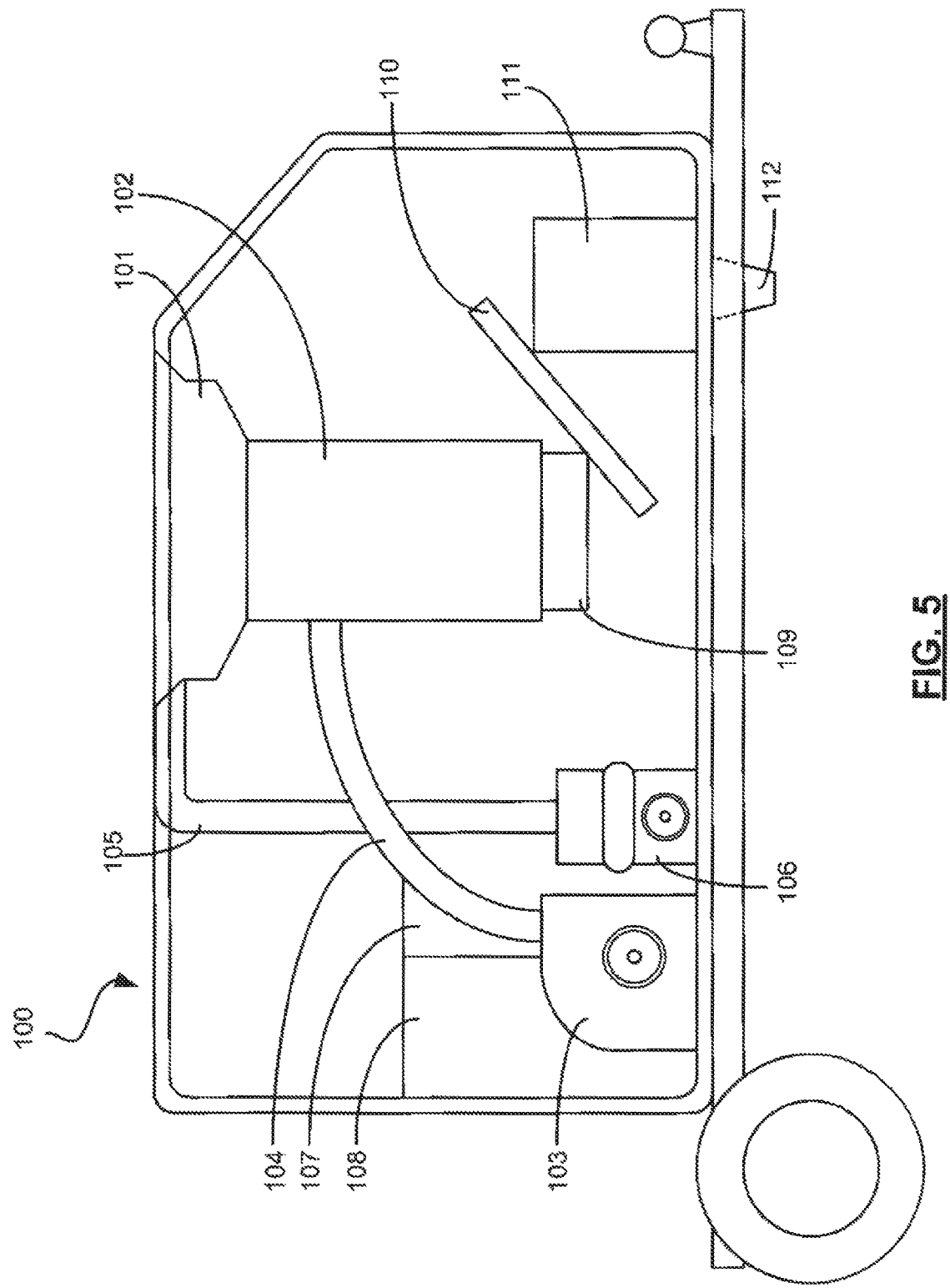
FIG. 5 is a side schematic view of a biochar generator located on a tow-behind vehicle according to an embodiment of the present invention.
Figure 6:
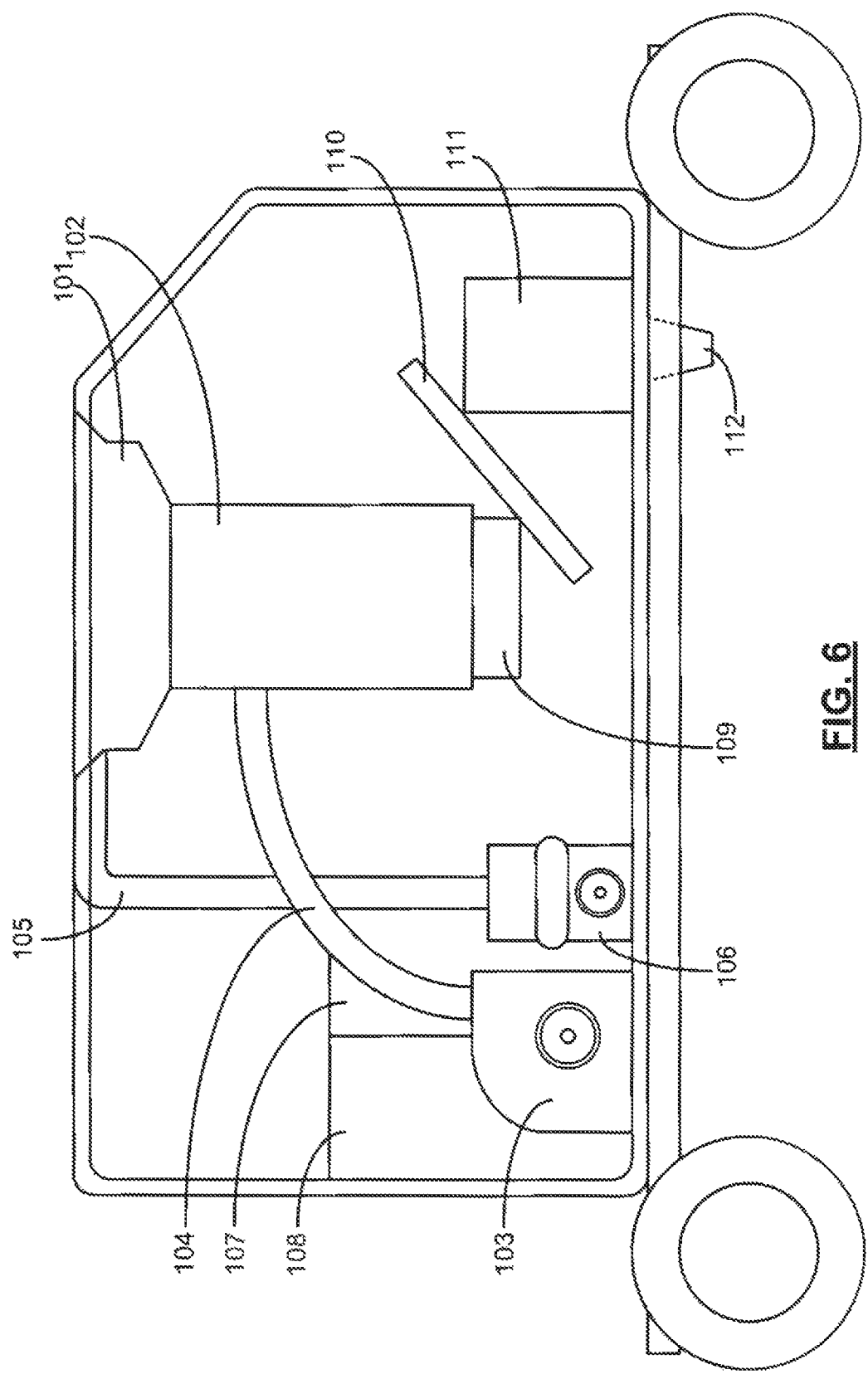
FIG. 6 is a side schematic view of a biochar generator located onboard an independently operated vehicle to follow behind a biomass harvesting machine according to an embodiment of the present invention.

After having had the benefit of reading this disclosure, those skilled in the art will appreciate that the biochar generator 100, while depicted in FIGS. 2 and 4 as being positioned onboard a biomass harvesting machine, may be positioned onboard a wheeled tow-behind vehicle attached to a biomass harvesting machine (FIG. 5), while still accomplishing the goals, features and objectives according to the present invention. Furthermore, those skilled in the art will also appreciate that the biochar generator 100 may be positioned onboard an independently operated wheeled vehicle that is adapted to follow behind the biomass harvesting machinery (FIG. 6). Although not shown, the present invention contemplates that in such an embodiment, a conveyor may be provided to move the biomass from the biomass harvester to the biochar generators. Those skilled in the art will also appreciate that the present invention contemplates any means of conveying the biomass from the biomass harvester to the biochar generator.

Those skilled in the art will appreciate that the synthesis gas collection chamber 107 may be adapted to feed the synthesis gas collected therein to the biomass harvesting machinery as a source of fuel. Likewise, those skilled in the art will appreciate that the bio oil collection chamber 108 may be adapted to feed the bio oil collected therein to the heater 103 as a source of fuel. Still further, those skilled in the art will appreciate that the predetermined temperature range and the predetermined period of time the temperature range is maintained may be adjusted to yield greater or lesser proportionate amounts of biochar, synthesis gas and bio oil and may be adjusted to more effectively pyrolyze different biomass sources. Finally, those skilled in the art will appreciate that while the heater 103 is described as using either synthesis gas or bio oil as a fuel source, some other fuel source, such as gasoline or diesel, must be used, at least initially, until sufficient synthesis gas or bio oil is produced as a result of the pyrolysis reaction to substitute for the initial fuel source.

Figure 3:
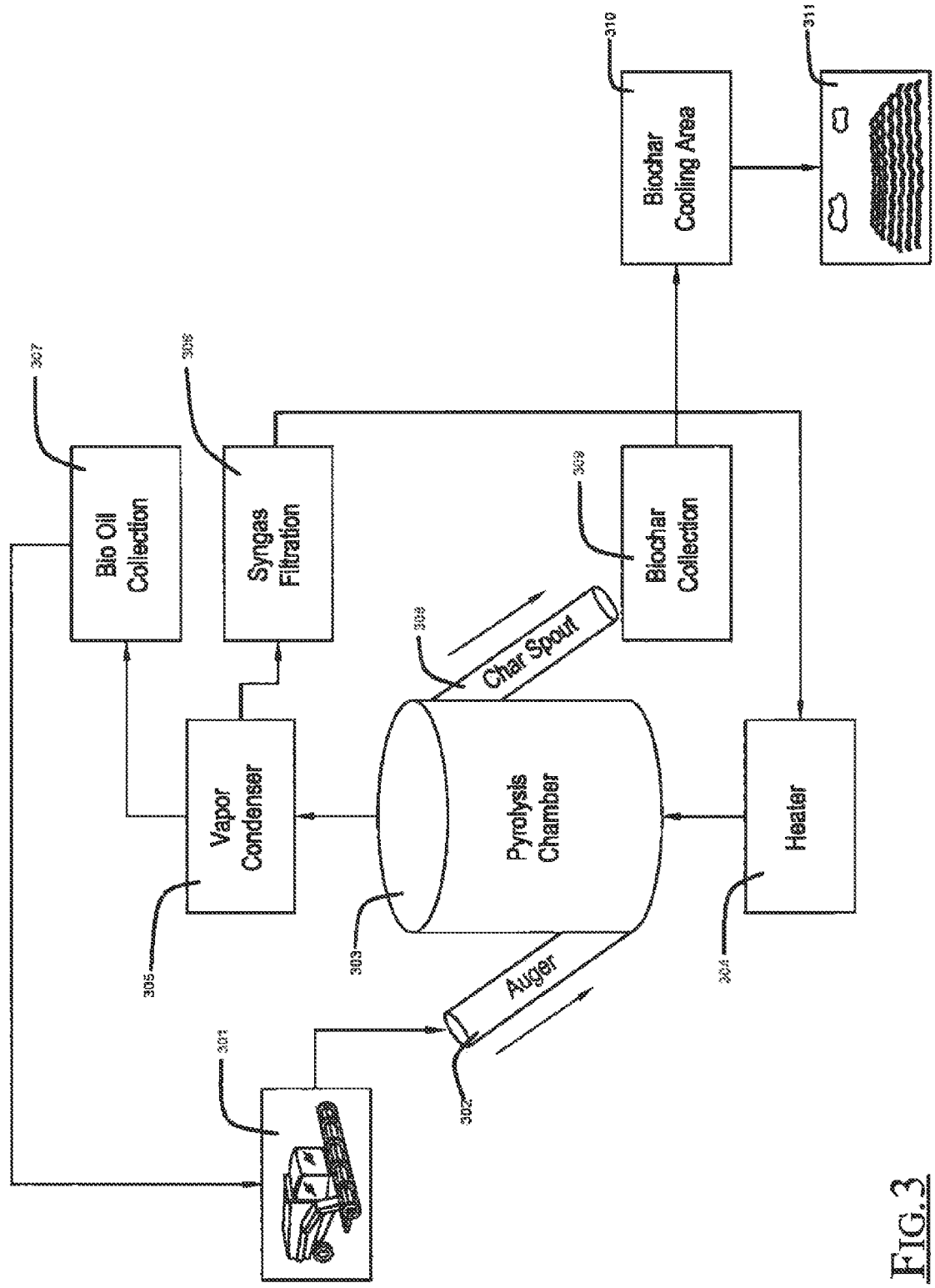
FIG. 3 is a schematic diagram showing a system and method of generating and using biochar, synthesis gas and bio oil using a biochar generator to be carried by a vehicle according to the present invention.

FIG. 3 illustrates a schematic diagram depicting the system and method of generating biochar, synthesis gas and bio oil using the biochar generator 100 according to an embodiment of the present invention. At Block 301, biomass, in this example waste from a combine, is fed directly into the auger attached to the pyrolysis chamber at Block 302. The fragmented biomass passes from the auger into the pyrolysis chamber at Block 303. Heat is introduced into the pyrolysis chamber at Block 304. Vaporized synthesis gasses and vaporized bio oil exit the pyrolysis chamber and enter the vapor condenser at Block 305. The condensed synthesis gasses are filtered at Block 306 and then fed back into the heater at Block 304. The condensed bio oil is collected at Block 307 and is then fed into the combine as a fuel source back at Block 301. The biochar passes through the char spout at Block 308, is collected at Block 309 and is allowed to cool in the biochar cooling area at Block 310. The cooled biochar is then applied to the field at Block 311. Those skilled in the art will appreciate that biochar, synthesis gas and bio oil not used in the process can be stored and likely used for other purposes, or may be sold to a third party.

After having had the benefit of reading this disclosure, those skilled in the art will appreciate that the schematic diagram depicting the system and method of generating biochar, synthesis gas and bio oil using the biochar generator 100 according to an embodiment of the present invention, while depicted in FIG. 3 as being positioned onboard a biomass harvesting machine, may be positioned onboard a wheeled tow-behind vehicle attached to a biomass harvesting machine, while still accomplishing the goals, features and objectives according to the present invention. Furthermore, those skilled in the art will also appreciate that the schematic diagram depicting the system and method of generating biochar, synthesis gas and bio oil using the biochar generator 100 according to an embodiment of the present invention may be positioned onboard an independently operated wheeled vehicle following behind the biomass harvesting machinery. Additionally, those skilled in the art will appreciate that the synthesis gasses may be fed into the biomass harvesting machinery as a source of fuel. Likewise, those skilled in the art will appreciate that the bio oil may be fed into the heater as a source of fuel. Finally, those skilled in the art will appreciate that while the heater is described as using either synthesis gas or bio oil as a fuel source, some other fuel source, such as gasoline or diesel, must be used, at least initially, until sufficient synthesis gas or bio oil is produced as a result of the pyrolysis reaction to substitute for the initial fuel source.

A non-limiting example of a method of using the biochar generator 100 according to an embodiment of the present invention, is now described. A user desiring to generate biochar using a biochar generator 100 according to an embodiment of the present invention may select a biomass harvesting machine having an onboard biochar generator, a biochar generator onboard a vehicle towed behind the machinery harvesting the biomass or a biochar generator onboard an independently operated vehicle following behind the machinery harvesting the biomass. A user may operate the selected biomass harvesting machine/biochar generator combination to harvest biomass, for instance, a combine with an onboard biochar generator harvesting corn. The waste biomass separated from the ears of corn harvested by the combine may be directed into the auger 101 of the onboard biochar generator 100. The waste biomass may be passed from the auger 101 into the pyrolysis chamber 102.

The temperature within the pyrolysis chamber 102 may be increased by introducing heat produced by the heater 103 through the heat duct 104. The heated biomass within the pyrolysis chamber 103 may produce vaporized synthesis gasses, vaporized bio oil and biochar. The vaporized synthesis gasses and vaporized bio oil may be permitted to exit the pyrolysis chamber 102 through the vapor duct 105. The vaporized synthesis gasses and vaporized bio oil may be condensed within the vapor condenser 106. The condensed synthesis gasses may be collected in the synthesis gas collection chamber 107. The collected synthesis gasses may be fed into the heater 103 as a fuel source, may be fed into the combine as a fuel source or may be sold as a fuel. Those skilled in the art will appreciate that the synthesis gas collection chamber may be bypassed and the synthesis gas may be fed directly in to the heater 103 or the combine. The condensed bio oil may be collected in the bio oil collection chamber 108. The collected bio oil may be fed into the heater 103 as a fuel source, may be fed into the combine as a fuel source or may be sold as a fuel. Similar to the condensed synthesis gas, those skilled in the art will appreciate that the bio oil collection chamber 108 may be bypassed and the bio oil may be ded directly into the heater 103 or the combine. The heated biochar may be permitted to enter the biochar cooling chamber 109. The cooled biochar may be conveyed from the biochar cooling chamber 109 to the biochar collection chamber 111 via the biochar conveyor 110. The collected biochar may be applied to the harvested cornfield via the biochar application device 112. Those skilled in the art will appreciate that the biochar collection chamber 111 may be bypassed and that the cooled biochar may be applied directly to the harvested cornfield.

Additional features of the biochar generator according to an embodiment of the present invention are now described in greater detail. As illustrated in FIG. 2, the biochar generator 100 may comprise a pyrolysis chamber 102, an auger 101 connected to the pyrolysis chamber. The auger 101 may include an opening to accept a flow of biomass. The biochar generator 100 may also include a heater 103 and a vapor condenser 106 connected to the pyrolysis chamber. The biochar generator 100 may further include a synthesis gas collection chamber 107 in communication with the vapor condenser to collect synthesis gas from the vapor condenser. A bio oil collection chamber 108 may be included and positioned in communication with the vapor condenser to collect bio oil from the vapor condenser. The biochar generator 100 may also include a biochar collection chamber 109 in communication with the pyrolysis chamber. The biochar collection chamber 109 may include a biochar conveyor 110 to collect biochar dispensed from the pyrolysis chamber. A biochar cooling chamber 111 may be positioned in communication with the biochar collection chamber via the biochar conveyor 110. The auger 101 may fragment the flow of biomass before passing the flow of biomass into the pyrolysis chamber 102.

In some embodiments of the biochar generator 100 according to the present invention, the auger 101 may permit selective control of an amount of air to be introduced into the pyrolysis chamber 102. The heat produced by the heater 103 may be within a range of between about 300 degrees Celsius and 600 degrees Celsius. The heat may be maintained for an amount of time. The heat may alternatively be maintained at different temperatures within the range for different amounts of time.

The amount of time and/or the amount of heat may, for example, be dependent on the type of biomass that is being processed by the biochar generator. Some types of biomass may require more exposure to heat than other types of biomass to produce the biochar and, accordingly, the amount of time that the biomass is exposed to the heat may be varied. Alternatively, the amount of time and/or the amount of heat may, for example, be dependent on a proportionate amount of synthesis gas, bio oil, or biochar desired to be produced from the pyrolysis reaction. This can be controlled using a controller, for example. More particularly, the heater 103 may be positioned in communication with a controller.

The present invention also contemplates the use of a computerized program in communication with the controller to further control the heat exposure of the biomass. The computerized program may be carried by the vehicle and may be used to program generation of the biochar using the biochar generator 100 according to an embodiment of the present invention. For exemplary purposes only, the computerized program may include a database that may include information relating to different types of biomass, and the requirements necessary for converting the different types of biomass to biochar. The database may also include information relating to expected biochar production based on the type of biomass being harvested, as well as based on other factors, i.e., moisture content, density, etc. The computer program may be used to determine certain settings to be used on the biochar generator, i.e., with respect to the heat input, the auger speed, the amount of air introduced into the pyrolysis chamber, etc. to most efficiently convert the biomass to biochar. The computer program may also be used to predict the amount of synthesis gas and bio oil that may be produced during the biochar generation process, as well as monitor and record the amount of fuel used by the vehicle that carried the biochar generator. Those skilled in the art will appreciate that there are several different variables in the biochar generation process that can be controlled using the computer program, and that the above is meant for exemplary purposes only, and in no way meant to be limiting.

A heat duct 104 may selectively control passage of heat from the heater 103 into the pyrolysis chamber 102. A pyrolysis reaction may occur in the pyrolysis chamber 102 and may produce at least one product selected from the group consisting of a vaporized synthesis gas, a vaporized bio oil and the biochar.

In some embodiments of the biochar generator 100, a vapor duct 105 may selectively control passage of the vaporized synthesis gas from the pyrolysis chamber 102 to the synthesis gas collection chamber 107. The vapor duct 105 may also selectively control passage of the vaporized bio oil from the pyrolysis chamber 102 to the bio oil collection chamber 108. The synthesis gas collection chamber 107 may be connected to the heater 103, and the heater may be selectively fueled by the synthesis gas from the synthesis gas collection chamber. The bio oil collection chamber 108 may also be connected to the heater 103, and the heater may, alternatively, be selectively fueled by the bio oil from the bio oil collection chamber.

In some embodiments of the present invention, the biochar generator may be located onboard a biomass harvesting machine. The bio oil collection chamber 108 may be connected to a fuel system of the biomass harvesting machine, and the biomass harvesting machine may be selectively fueled by the bio oil from the bio oil collection chamber. In such an embodiment, the biochar generator 100 may be located onboard a wheeled tow-behind vehicle attached to a biomass harvesting machine.

In other embodiments of the present invention, the biochar generator 100 may be located onboard an independently operated wheeled vehicle following behind a biomass harvesting machine. For exemplary purposes only, the independently operated wheeled vehicle with the biochar generator 100 located onboard following behind a biomass harvesting machine may include a synthesis gas delivery system connected to the synthesis gas collection chamber 107 and a bio oil delivery system connected to the bio oil connection chamber 108. The synthesis gas delivery system and the bio oil delivery system may permit the synthesis gas and/or the bio oil produced onboard the independently operated wheeled vehicle to be delivered to a fuel system of the biomass harvesting machine, and the biomass harvesting machine may be selectively fueled by the synthesis gas and/or the bio oil. The bio oil collection chamber 108 may also be connected to a fuel system of the independently operated wheeled vehicle, and the vehicle may be selectively fueled by the bio oil from the bio oil collection chamber.

Those skilled in the art will appreciate that the present invention also contemplates the use of a single independently operated wheeled vehicle with the biochar generator 100 located onboard to follow behind multiple biomass harvesting machines, and that the above is meant for exemplary purposes only, and is in no way meant to be limiting. A biochar application device 112 in communication with the biochar cooling chamber 111 may selectively permit application of the biochar. The vehicle that carries the biochar generator may be fueled by the synthesis gas from the synthesis gas collection chamber 107 and/or the bio oil from the bio oil collection chamber 108.

Figure 7:
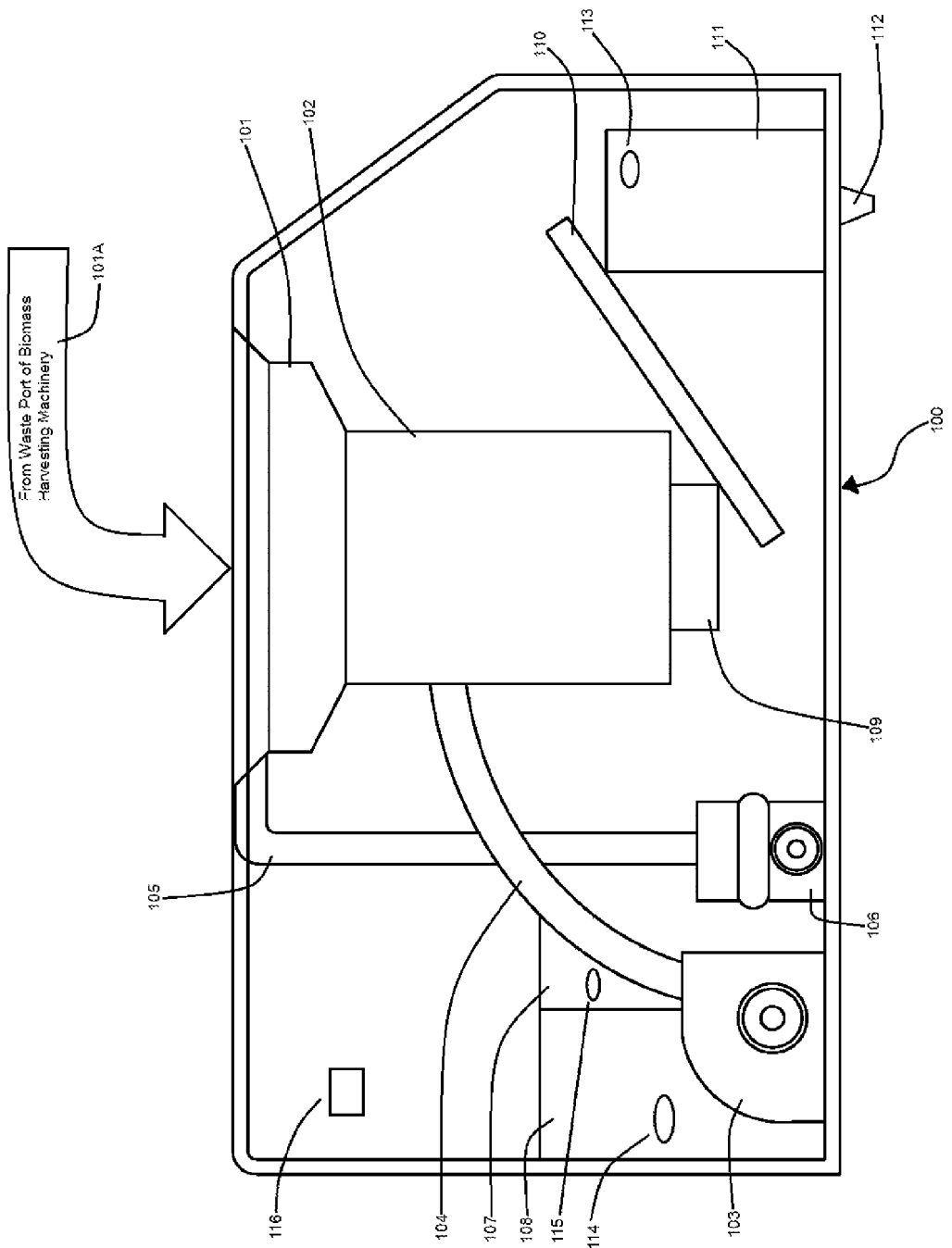
FIG. 7 is a side schematic view of an alternative embodiment of the biochar generator according to the present invention.

Referring now additionally to FIG. 7, an alternative embodiment of the present invention is now described. In this embodiment, the biochar generator 100 may be adapted to dynamically modify the output biochar, synthetic gas and vapor oil. In this embodiment, the biochar generator 100 is equipped with additional sensors. The biochar generator 100 may include a biochar collection chamber sensor 113 in the biochar collection chamber 111, a bio oil collection chamber sensor 114 in the bio oil collection chamber 108, and a synthesis gas collection chamber sensor 115 in the synthesis gas collection chamber 107. The sensors 113-115 may sense the composition of the biochar, bio oil and synthesis gas respectively. A controller 116 may be in communication with each sensor 113-115 and may dynamically alter conditions in the pyrolysis chamber to alter the composition of the biochar. The biochar collection chamber sensor 113 may sense a composition of the biochar collected in the biochar collection chamber 111 to define a sensed composition of biochar. The bio oil collection chamber sensor 114 may sense a composition of the bio oil collected in the bio oil collection chamber to define a sensed composition of the bio oil. The synthesis gas collection chamber sensor 115 may sense a composition of the synthetic gas to define a sensed composition of the synthesis gas. Each sensor 113-115 may be a laser sensor.

A person of ordinary skill in the art will appreciate that the location of the sensors may be modified without changing the scope of the invention. A skilled artisan may opt to place a sensor in the pyrolysis chamber 102, vapor condenser 106, vapor duct 105 or on the biochar conveyor 110. The sensor may be tailored to detect the composition of a single output product or every output product which comes in contact with the sensor. The sensor may be equipped to communicate its readings to a controller.

The controller 116 may utilize readings from biochar collection chamber sensor 113 to alter conditions in the pyrolysis chamber 102 to alter the composition of the biochar. The controller 116 may utilize readings from the bio oil collection chamber sensor 114 to alter conditions in the pyrolysis chamber 102 to alter the composition of the bio oil. The controller 116 may also utilize readings from the synthesis gas collection chamber sensor 115 to alter conditions in the pyrolysis chamber 102.

The conditions that controller 116 may alter to obtain a desired composition of biochar, bio oil and synthesis gas may include oxygen content in the pyrolysis chamber, temperature in the pyrolysis chamber, time that bio mass is pyrolysized in the pyrolysis chamber, flow of the bio mass into the pyrolysis chamber or pressure inside the pyrolysis chamber. The conditions dynamically altered in the pyrolysis chamber 111 may also modify at least one of carbon content of the biochar, absorption properties of the biochar, or a ratio of biochar, synthetic gas and bio oil produced by the pyrolysis chamber.

The controller 116 may modify the conditions in response to user input regarding the desired composition of the biochar, bio oil and synthesis gas. The chemical composition of the biomass varies depending on what is in the bio mass. Therefore, the controller 116 may utilize the readings from the biochar collection chamber sensor 113, bio oil collection chamber sensor 114, and the synthesis gas collection chamber 115 and alter the conditions in the pyrolysis chamber until the desired product composition is output.

A skilled artisan will appreciate that the pyrolysis chamber 102 and/or the auger 101 may be equipped with a sensor in electrical communication with the controller 116 that may sense the chemical composition of the biomass input. The chemical composition of the biomass may be communicated to the controller 116. The controller 116 may alter the conditions in the pyrolysis chamber based upon the chemical composition of the input to produce the desired output. The controller 116 may utilize readings indicating the chemical composition of the biomass in concert with readings from at least one sensor 113-116 to determine how to adjust the conditions inside the pyrolysis chamber.

A skilled artisan will also appreciate that a sensor located inside the pyrolysis chamber 102 may be a plurality of sensors that may be equipped to sense the chemical composition of the biomass and the composition of at least one output product.

Although the biochar generator 100 illustrated in FIG. 7 is shown as a tow behind biochar generator, similar to that illustrated in FIG. 2, those skilled in the art will appreciate that the biochar generator of this embodiment of the invention may advantageously also be a incorporated into the vehicle, as illustrated in FIG. 4, or an independent vehicle, as illustrated in FIG. 6.

Another method aspect of the present invention is for generating biochar. The method of generating biochar may include sensing a composition of the biochar collected in the biochar collection chamber 111 to define a sensed composition of the biochar. The method may further include utilizing the sensed composition of the biochar to dynamically alter conditions in the pyrolysis chamber 102 to alter the composition of the biochar.

The biochar generator 100 may further include a synthesis gas collection chamber sensor 115 for sensing a composition of the synthesis gas collected in the synthesis gas collection chamber 107 to define a sensed composition of the synthesis gas. The method may further include utilizing the sensed composition of the synthesis gas to dynamically alter conditions in at least one of the pyrolysis chamber 102 or the vapor condenser 106 to alter the composition of the synthesis gas.

The method may further include sensing a composition of the bio oil collected in the bio oil collection chamber 108 to define a sensed composition of the bio oil. The method may still further include utilizing the sensed composition of the bio oil to dynamically alter conditions in the pyrolysis chamber 102 to alter the composition of the bio oil.

The conditions altered in the pyrolysis chamber may be at least one of oxygen content in the pyrolysis chamber, temperature in the pyrolysis chamber, time that bio mass is pyrolysized in the pyrolysis chamber, flow of the bio mass into the pyrolysis chamber or pressure inside the pyrolysis chamber.

In the method aspect of the invention, the biochar collection sensor 113, the synthetic gas collection chamber sensor 114, and the bio oil collection chamber sensor 115 may be a laser sensor. The biochar generator 100 may include an auger 101 having an opening formed therein and connected to the pyrolysis chamber to accept a flow of biomass. The biochar generator 100 may also include a biochar application device 112 for selectively permitting application of the biochar.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

That which is claimed is:

1. A biochar generator comprising:
   a pyrolysis chamber;
   a heater connected to the pyrolysis chamber;
   a biochar collection chamber in communication with the pyrolysis chamber;
   a biochar collection chamber sensor to sense a composition of the biochar collected in the biochar collection chamber to define a sensed composition of the biochar; and
   a controller in electrical communication with the biochar collection chamber sensor;
   wherein the controller utilizes the sensed composition of the biochar to dynamically alter conditions in the pyrolysis chamber to alter the composition of the biochar.

2. The biochar generator according to claim 1 further comprising:
   a vapor condenser connected to the pyrolysis chamber;
   a synthesis gas collection chamber in communication with the vapor condenser to collect synthesis gas from the vapor condenser; and
   a bio oil collection chamber in communication with the vapor condenser to collect bio oil from the vapor condenser.

3. The biochar generator according to claim 2 further comprising a bio oil collection chamber sensor to sense a composition of the bio oil collected in the bio oil collection chamber to define a sensed composition of the bio oil; and wherein the controller utilizes the sensed composition of the bio oil to dynamically alter conditions in at least one of the pyrolysis chamber or the vapor condenser to alter the composition of the bio oil.

4. The biochar generator according to claim 2 further comprising a synthesis gas collection chamber sensor to sense a composition of the synthesis gas collected in the synthesis gas collection chamber to define a sensed composition of the synthesis gas; and wherein the controller utilizes the sensed composition of the synthesis gas to dynamically alter conditions in at least one of the pyrolysis chamber or the vapor condenser to alter the composition of the synthesis gas.

5. The biochar generator according to claim 1 wherein the conditions altered in the pyrolysis chamber are at least one of oxygen content in the pyrolysis chamber, temperature in the pyrolysis chamber, time that bio mass is pyrolysized in the pyrolysis chamber, flow of the bio mass into the pyrolysis chamber or pressure inside the pyrolysis chamber.

6. The biochar generator according to claim 1 wherein the conditions dynamically altered in the pyrolysis chamber modify at least one of carbon content of the biochar, absorption properties of the biochar, or a ratio of biochar, synthetic gas and bio oil produced by the pyrolysis chamber.

7. The biochar generator according to claim 1 wherein the biochar collection chamber sensor is a laser sensor.

8. The biochar generator according to claim 1 further comprising an auger having an opening formed therein and connected to the pyrolysis chamber to accept a flow of biomass.

9. The biochar generator according to claim 1 further comprising a biochar application device to selectively permit application of the biochar.

10. A biochar generator comprising:
    a pyrolysis chamber;
    a heater connected to the pyrolysis chamber;
    a biochar collection chamber in communication with the pyrolysis chamber;
    a vapor condenser connected to the pyrolysis chamber;
    a synthesis gas collection chamber in communication with the vapor condenser to collect synthesis gas from the vapor condenser;
    a bio oil collection chamber in communication with the vapor condenser to collect bio oil from the vapor condenser;

a biochar collection chamber sensor to sense a composition of the biochar collected in the biochar collection chamber to define a sensed composition of the biochar;

a bio oil collection chamber sensor to sense a composition of the bio oil collected in the bio oil collection chamber to define a sensed composition of the bio oil;

a synthesis gas collection chamber sensor to sense a composition of the synthesis gas collected in the synthesis gas collection chamber to define a sensed composition of the synthesis gas; and a controller in electrical communication with the biochar collection chamber sensor, the bio oil collection chamber sensor and the synthesis gas collection chamber;

wherein the controller utilizes the sensed composition of at least one of the biochar, the bio oil and the synthesis gas to dynamically alter conditions in at least one of the pyrolysis chamber and the vapor condenser to alter the composition of at least one of the biochar, the bio oil and the synthesis gas.

11. The biochar generator according to claim 10 wherein the conditions altered in the pyrolysis chamber are at least one of oxygen content in the pyrolysis chamber, temperature in the pyrolysis chamber, time that bio mass is pyrolysized in the pyrolysis chamber, flow of the bio mass into the pyrolysis chamber or pressure inside the pyrolysis chamber.

12. The biochar generator according to claim 10 wherein the conditions dynamically altered in the pyrolysis chamber modify at least one of carbon content of the biochar, absorption properties of the biochar, or a ratio of biochar, synthetic gas and bio oil produced by the pyrolysis chamber.

13. The biochar generator according to claim 10 wherein at least one of the biochar collection chamber sensor, the bio oil collection chamber sensor and the synthesis gas collection chamber sensor is a laser sensor.

14. The biochar generator according to claim 10 further comprising an auger having an opening formed therein and connected to the pyrolysis chamber to accept a flow of biomass.

15. The biochar generator according to claim 10 further comprising a biochar application device to selectively permit application of the biochar.

16. A method of generating biochar using a biochar generator that includes a pyrolysis chamber, a heater connected to the pyrolysis chamber, a biochar collection chamber in communication with the pyrolysis chamber, a biochar collection chamber sensor and a controller in electrical communication with the biochar collection chamber sensor, the method comprising:

sensing a composition of the biochar collected in the biochar collection chamber to define a sensed composition of the biochar; and utilizing the sensed composition of the biochar to dynamically alter conditions in the pyrolysis chamber to alter the composition of the biochar.

17. The method according to claim 16 wherein the biochar generator further comprises a vapor condenser connected to the pyrolysis chamber, a synthesis gas collection chamber in communication with the vapor condenser to collect synthesis gas from the vapor condenser, and a bio oil collection chamber in communication with the vapor condenser to collect bio oil from the vapor condenser.

18. The method according to claim 17 wherein the biochar generator further comprises a bio oil collection chamber sensor; and wherein the method further comprises sensing a composition of the bio oil collected in the bio oil collection chamber to define a sensed composition of the bio oil; and utilizing the sensed composition of the bio oil to dynamically alter conditions in at least one of the pyrolysis chamber or the vapor condenser to alter the composition of the bio oil.

19. The method according to claim 17 wherein the biochar generator further comprises a synthesis gas collection chamber sensor; and wherein the method further comprises sensing a composition of the synthesis gas collected in the synthesis gas collection chamber to define a sensed composition of the synthesis gas; and utilizing the sensed composition of the synthesis gas to dynamically alter conditions in at least one of the pyrolysis chamber or the vapor condenser to alter the composition of the synthesis gas.

20. The method according to claim 16 wherein the conditions altered in the pyrolysis chamber are at least one of oxygen content in the pyrolysis chamber, temperature in the pyrolysis chamber, time that bio mass is pyrolysized in the pyrolysis chamber, flow of the bio mass into the pyrolysis chamber or pressure inside the pyrolysis chamber.

21. The method according to claim 16 wherein the conditions dynamically altered in the pyrolysis chamber modify at least one of carbon content of the biochar, absorption properties of the biochar, or a ratio of biochar, synthetic gas and bio oil produced by the pyrolysis chamber.

22. The method according to claim 16 wherein the biochar collection chamber sensor is a laser sensor.

23. The method according to claim 16 wherein the biochar generator further comprises an auger having an opening formed therein and connected to the pyrolysis chamber to accept a flow of biomass.

24. The method according to claim 16 wherein the biochar generator further comprises a biochar application device; and further comprising selectively permitting application of the biochar.

\* \* \* \* \*